United States Patent [19]

Wallace

[11] 4,013,119
[45] Mar. 22, 1977

[54] AIR CONDITIONER CONTROL SYSTEM

[76] Inventor: Preston A. Wallace, 6000 Park Ave. 6F, Atlanta, Ga. 30342

[22] Filed: Dec. 15, 1975

[21] Appl. No.: 640,833

[52] U.S. Cl. .................................. 165/27; 361/191
[51] Int. Cl.² ...................................... G05D 23/19
[58] Field of Search ............... 165/27, 25; 236/1 C; 307/30; 317/137, 132

[56] References Cited
UNITED STATES PATENTS

| | | | |
|---|---|---|---|
| 2,939,121 | 5/1960 | Sagkay | 317/137 X |
| 3,415,310 | 12/1968 | Kuhlmann | 165/27 |
| 3,785,433 | 1/1974 | Ballard | 165/27 |

*Primary Examiner*—Alan Cohan
*Attorney, Agent, or Firm*—B. J. Powell

[57] ABSTRACT

A control system for controlling the operation of an air conditioning system having a heating mode capability, a cooling mode capability, and a common air distribution fan motor including a thermostatically operated heat switch; a thermostatically operated cool switch; a common fan motor control relay for operating the system fan motor; a cool control relay for operating the system in the cool mode energized upon closure of the cool switch; a heat control relay for operating the system in the heat mode energized upon closure of the heat switch; and, a diode network connecting the coil of the fan control relay to the cool switch and to the heat switch to energize the common fan control relay when either the heat switch or the cool switch is closed while preventing feedback from the heat control relay through the cool switch when the cool switch is closed and while preventing feedback from the cool control relay through the heat switch when said heat switch is closed.

4 Claims, 1 Drawing Figure

4,013,119

AIR CONDITIONER CONTROL SYSTEM

BACKGROUND OF THE INVENTION

Air conditioning systems which use a common electric motor driven fan to distribute the air throughout a building in both the heating and cooling modes are in wide use today. Usually, these systems are controlled from a thermostat which has a heat mode control switch and a cool mode control switch that alternatively operate the system in its heating mode or its cooling mode to condition the air in a building. Because such systems use a common fan motor, prior art controls for such systems have used a first fan control relay which operates the fan motor when the system is in its heating mode and a second relay which operates the fan motor when the system is in its cooling mode. Because of the cost of control relays, the use of two relays in such prior art systems has undesirably increased the manufacturing and installation cost of such systems and also increased the likelihood of system failure due to the malfunction of one of the fan control relays.

SUMMARY OF THE INVENTION

These and other problems and disadvantages associated with prior art air conditioning system controls are overcome by the invention disclosed herein by providing inexpensive and effective operating controls for air condition systems having a common fan motor without the requirement of two control relays to operate the fan motor in the alternative heating or cooling mode. The invention disclosed herein uses a first diode to selectively isolate the cool control relay from the fan control relay when the system is in the heating mode and to selectively isolate the heat control relay from the fan control relay when the system is in its cooling mode. Further, the invention permits the conversion of existing air conditioning systems with a minimum of components simply by replacing the presently available thermostat on the system with the invention.

The apparatus of the invention includes a thermostat with a system operation selector switch which permits the manual selection of cooling mode operation, heating mode operation, or automatic mode operation of an air conditioning system, a thermostatically operated cool switch which controls the cool control relay of the system, a thermostatically operated heat switch which controls the heat control relay of the system, and a diode network that isolates the heat control relay during cooling mode operation and isolates the cool control relay during heating mode operation of the system.

These and other features and advantages of the invention will become more clearly understood upon consideration of the following specifications and accompanying drawings wherein like characters are reference designate corresponding parts throughout the several views and in which:

Figure 1:
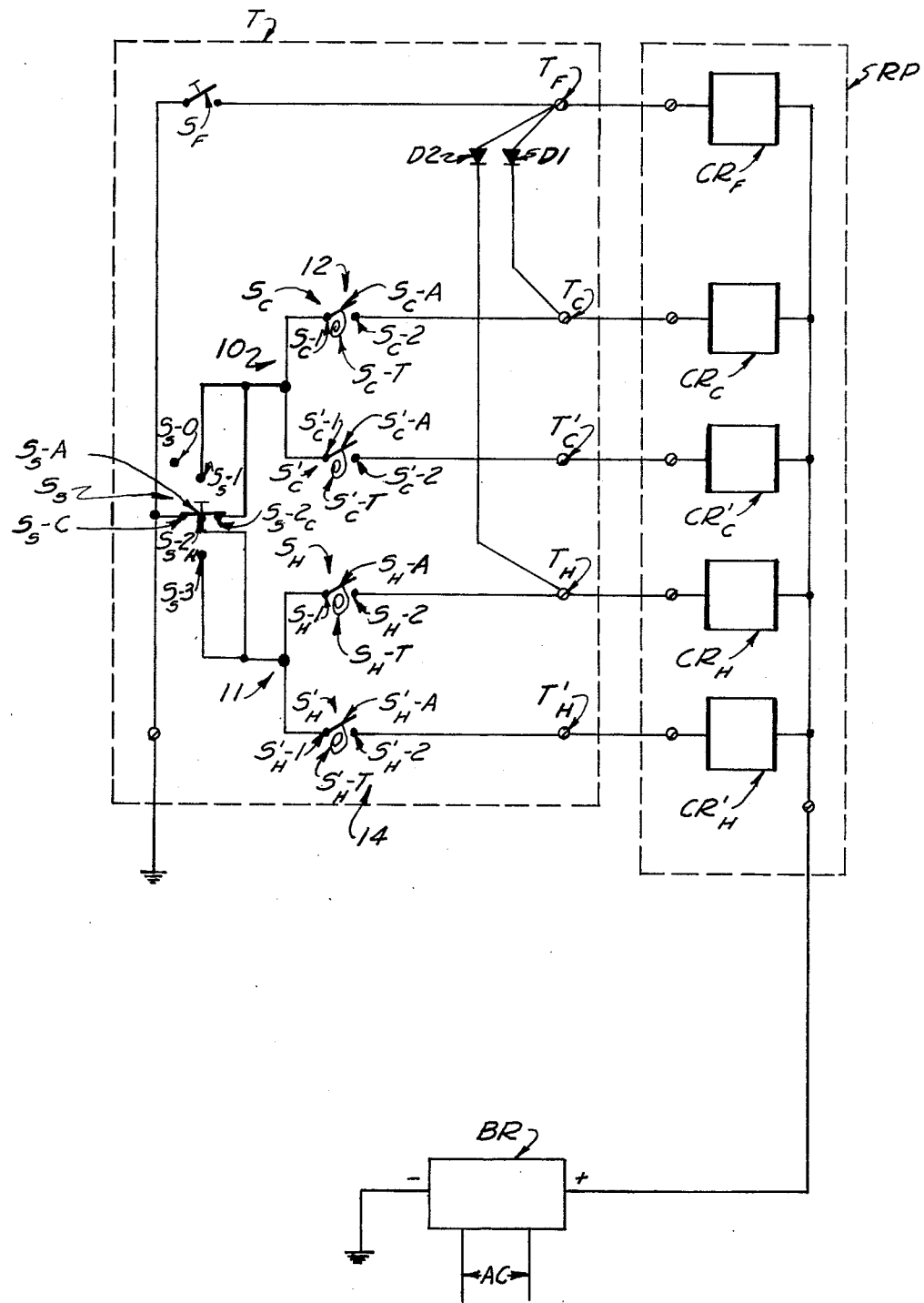
FIG. 1 is a schematic diagram illustrating the invention.

This FIGURE and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the FIGURE, it will be seen that the invention comprises generally a thermostat T which is used to control the relay panel RP of a conventional air conditioning system with heating and cooling modes and having a common air distribution fan for both modes. Only the relay control panel RP is illustrated since the system is well known.

The thermostat T includes a manually operable mode selector switch $S_S$ which has a plurality of positions to manually select the operation of the system. The switch $S_S$ has a common $S_S$-C, a normally open contact $S_S$-O, a cool contact $S_S$-1, a pair of automatic contacts $S_S$-$2_C$ and $S_S$-$2_H$, and a heat contact $S_S$-3 with a switch arm $S_S$-A selectively connecting the contact $S_S$-C with the other contacts. The contact $S_S$-O is normally unconnected and serves as the "off" position for the switch $S_S$. The contact $S_S$-1 is normally connected to the cool mode control circuit branch 10 and the contact $S_S$-3 is normally connected to the heat control circuit branch 11. The automatic contact $S_S$-$2_C$ is connected to the cool mode control circuit branch 10 while the contact $S_S$-$2_H$ is connected to the heat mode control circuit branch 11. The arm $S_S$-A connects both automatic contacts $S_S$-$2_C$ and $S_S$-$2_H$ to the common contact $S_S$-C at the same time yet isolates the circuit branches 10 and 11 from each other when arm $S_S$-A is not closing contacts $S_S$-$2_C$ and $S_S$-$2_H$.

The cool mode control circuit branch 10 includes a thermostatically operated cooling switch unit 12 which operates in response to temperature changes in the air conditioned space. The switch unit 12 includes a primary thermostatically operated switch $S_C$ which controls the primary cool stage of the air conditioning system. The common contact $S_C$-1 is connected to the contact $S_S$-1 and $S_S$-$2_C$ of the selector switch $S_S$ while the other contact $S_C$-2 is connected to the primary stage output terminal $T_C$. The switch arm $S_C$-A of switch $S_C$ is controlled by the thermostatic element $S_C$-T in known manner. In larger systems, the switch assembly 12 may also include a secondary thermostatically operated switch $S_C'$ which also has its common contact $S_C'$-1 connected to both contacts $S_S$-1 and $S_S$-$2_C$ of the selector switch $S_S$ while its other contact $S_C'$-2 is connected to the secondary output terminal $T_C'$ on the thermostat T. The switch arm $S_C'$-A is controlled by the thermostatic element $S_C'$-T in known manner.

The circuit branch 11 includes a thermostatically operated heat switch unit 14 which includes a primary thermostatically operated heat switch $S_H$ with its common contact $S_H$-1 connected to both contacts $S_S$-3 and $S_S$-$2_H$ of the selector switch $S_S$. The other contact $S_H$-A of switch $S_H$ is connected to the primary heat output terminal $T_H$ on the thermostat. The switch arm $S_H$-A is controlled by the thermostatic element $S_H$-T in known manner. The switch unit 14 may also have a secondary switch $S_H'$ with its common contact $S_H'$-1 connected to the contacts $S_S$-$2_H$ and $S_S$-3 of the switch $S_S$ while its other contact $S_H'$-2 is connected to the secondary output terminal $T_H'$ of the thermostat. The switch arm $S_H'$-A is controlled by the thermostatic element $S_H'$-T in known manner. Thus, it will be seen that when the switch arm $S_S$-A connects contacts $S_S$-$2_C$ and $S_S$-$2_H$ with the common contact $S_S$-C, the system is automatic mode and will respond by either heating or cooling the air as required. If the switch $S_C$ is closed, the output terminal $T_C$ will be grounded while the switch $S_H$ being closed serves to ground the terminal $T_H$.

The primary cooling terminal $T_C$ is connected to the coil of the primary stage cool control relay $CR_C$ in the control panel RP while the primary heat terminal $T_H$ is connected to the coil of the primary heat control state relay $CR_H$ in the panel RP. When the secondary capability is present, the secondary cooling terminal $T_C'$ is connected to the coil of the secondary stage cool control relay $CR_C'$ while the secondary heating terminal $T_H'$ is connected to the coil of the secondary stage heat control relay $CR_H'$. The thermostat T also includes a fan control terminal $T_F$ connected to the coil of the fan control relay $CR_F$ in the panel RP. The terminal $T_F$ must be connected to the primary cool terminal $T_C$ as well as the primary heat terminal $T_H$ in order that the fan control relay $CR_F$ will be operated when either the cool circuit branch 10 is energized or when the heat circuit branch 11 is energized.

In order to isolate the control relays $CR_C$ and $CR_H$ from operation due to feedback through the common connection to the fan terminal $T_F$, a diode network 15 is provided in the thermostat T. The diode network 15 comprises a first diode D1 connected between the fan terminal $T_F$ and the primary cool terminal $T_C$ with its positive side connected to the terminal $T_F$. A second diode D2 is connected between the fan terminal $T_F$ and the primary heat terminal $T_H$ with the positive side connected to the terminal $T_F$. Also, it is desirable to sometimes operate the fan without either the heat or cool mode operating. This operation is provided by a fan control switch which is also connected to the terminal $T_F$ to energize the fan control relay $CR_F$ when the switch $S_F$ is closed and to place the fan control relay $CR_F$ in automatic mode when the switch $S_F$ is opened. The common contact $S_S$-C and the switch $S_F$ are both connected to ground while the opposite sides of the coils of the control relays $CR_F$, $CR_C$, $CR_C'$, $CR_H$, and $CR_H'$ are connected to a positive DC supply voltage.

Thus, it will be seen that when the switch arm $S_S$-A connects the contacts $S_S$-$2_C$ and $S_S$-$2_H$ with the common contact $S_S$-C in selector switch $S_S$, the primary cool control relay $CR_C$ will be operated when switch $S_C$ is closed while the primary heat control relay $CR_H$ will be operated when the switch $S_H$ is closed. It will also be noted that when the switch $S_C$ is closed or when the switch $S_H$ is closed, the fan control relay $CR_F$ will also be operated through the appropriate diode D1 or D2. When switch $S_C$ is closed, the coil of the fan control relay $CR_F$ will be grounded to operate through diode D1 while the diode D2 will prevent the coil of the heat control relay $CR_H$ from being grounded through terminal $T_F$ so that the relay $CR_H$ is isolated from the cool mode operation. On the other hand, when the switch $S_H$ is closed, the coil of the cool control relay $CR_C$ will be prevented from being grounded by the diode D1 while the diode D2 allows the coil of the fan control relay $CR_F$ to be grounded to operate. Because the primary cool stage will always be operating when the secondary cool stage is operating, the fan will be adequately controlled from terminal $T_C$. Likewise, because the primary heat stage will always be operating when the secondary heat stage is operating, the fan will be adequately controlled from terminal $T_H$.

While a number of different power sources may be used, a bridge rectifier BR may be used powered from the AC power lines with its +DC voltage output connected to the coils of relays $CR_F$, $CR_C$, $CR_C'$, $CR_H$ and $CR_H'$. The bridge rectifier BR supplies full power to the relays.

While specific embodiments of the invention have been disclosed herein, full use may be made of modifications, substitutions, and equivalents without departing from the scope of the invention.

I claim:

1. A control system for controlling the operation of an air conditioning system having a heating mode capability, a cooling mode capability, and a common air distribution fan motor comprising:
   a thermostatically operated heat switch;
   a thermostatically operated cool switch;
   a common fan motor control relay for operating the system fan motor;
   a cool control relay for operating the system in the cool mode, the coil of said cool control relay connected to said cool switch to energize said cool control relay upon closure of said cool switch;
   a heat control relay for operating the system in the heat mode; the coil of said heat control relay connected to said heat switch to energize said heat control relay upon closure of said heat switch; and,
   a diode network connecting the coil of said fan control relay to said cool switch and to said heat switch to energize said common fan control relay when said heat switch is closed and to energize said common fan control relay when said cool switch is closed while preventing feedback from the coil of said heat control relay through said cool switch so that said heat control relay will not be energized when said cool switch is closed and while preventing feedback from the coil of said cool control relay through said heat switch so that said cool control relay will not be energized when said heat switch is closed.

2. The control system of claim 1 wherein said diode network includes a first diode and a second diode, said first diode connecting the coil of said common fan control relay to the common point between said cool switch and the coil of said cool control relay, and said second diode connecting the coil of said common fan control relay to the common point between said heat switch and the coil of said heat control relay; said first and second diodes oriented so that current can flow between the coil of said common fan control relay and said cool switch when said cool switch is closed, so that current can flow between the coil of said common fan control relay and said heat switch when said heat switch is closed so that current can flow between the coil of said cool control relay and said cool switch when said cool switch is closed, so that current can flow between the coil of said heat control relay and said heat switch when said heat switch is closed, so that current cannot flow between the coil of said cool control relay and said heat switch when said heat switch is closed, and so that current cannot flow between the coil of said heat control relay and said cool switch when said cool switch is closed.

3. The system of claim 2 further including selector switch means for selectively enabling said heat switch and said cool switch.

4. The system of claim 2 further including a positive DC voltage source and an electrical ground, one side of the coils of said fan, heat and cool control relays connected directly to said positive DC voltage source, the other side of the coils of said fan, heat and cool control relays connected to said electrical ground through said heat and cool switches, and the anodes of said first and second diodes connected directly to the other side of the coil of said fan control relay.

* * * * *